US008630346B2

(12) United States Patent
Chappalli et al.

(10) Patent No.: US 8,630,346 B2
(45) Date of Patent: Jan. 14, 2014

(54) SYSTEM AND METHOD FOR INTRODUCING VIRTUAL ZERO MOTION VECTOR CANDIDATES IN AREAS OF A VIDEO SEQUENCE INVOLVING OVERLAYS

(75) Inventors: Mahesh Chappalli, Irvine, CA (US); Yeong-Taeg Kim, Irvine, CA (US)

(73) Assignee: Samsung Electronics Co., Ltd, Suwon, Gyeonggi-Do (KR)

( * ) Notice: Subject to any disclaimer, the term of this patent is extended or adjusted under 35 U.S.C. 154(b) by 1782 days.

(21) Appl. No.: 11/709,047

(22) Filed: Feb. 20, 2007

(65) Prior Publication Data

US 2008/0198931 A1  Aug. 21, 2008

(51) Int. Cl.
*H04N 7/12*   (2006.01)

(52) U.S. Cl.
USPC ............. 375/240.14; 375/240.12; 375/240.27

(58) Field of Classification Search
USPC ........................................ 375/240.16, 240.14
See application file for complete search history.

(56) References Cited

U.S. PATENT DOCUMENTS

| | | | | |
|---|---|---|---|---|
| 6,028,963 A * | 2/2000 | Kajiwara | ...................... | 382/239 |
| 6,259,734 B1 * | 7/2001 | Boon | ........................... | 375/240 |
| 7,933,330 B2 * | 4/2011 | Kadono et al. | ........... | 375/240.12 |
| 2003/0142751 A1 * | 7/2003 | Hannuksela | ............. | 375/240.25 |
| 2007/0005795 A1 * | 1/2007 | Gonzalez | ...................... | 709/232 |
| 2007/0098067 A1 * | 5/2007 | Kim et al. | ................. | 375/240.08 |
| 2008/0089411 A1 * | 4/2008 | Wenger et al. | ........... | 375/240.12 |

FOREIGN PATENT DOCUMENTS

| | | |
|---|---|---|
| JP | 2005-506776 A | 3/2005 |
| KR | 10-1999-0081353 A | 3/2005 |
| KR | 10-2007-0006079 A | 1/2007 |

* cited by examiner

*Primary Examiner* — Mohammad L Rahman
(74) *Attorney, Agent, or Firm* — IP Investment Law Group

(57) ABSTRACT

Systems and methods for efficiently encoding and/or reformatting video data including transparent overlay portions are disclosed. In one embodiment, the method includes using two prediction regions for predicting the portion of the video including the transparent overlay. In one embodiment, a first of the two prediction regions is determined based on motion compensated prediction in reference to another video frame and a second of the two prediction regions is a collocated portion of video in another frame as referenced by a virtual zero motion vector. A mixing weight factor to be used for combining the two predictions is determined. In one embodiment, the mixing weight factor is determined based on the relative values of two error metrics, a first error metric related to the motion compensated prediction and a second error metric related to the collocated prediction of the virtual zero motion vector.

20 Claims, 9 Drawing Sheets

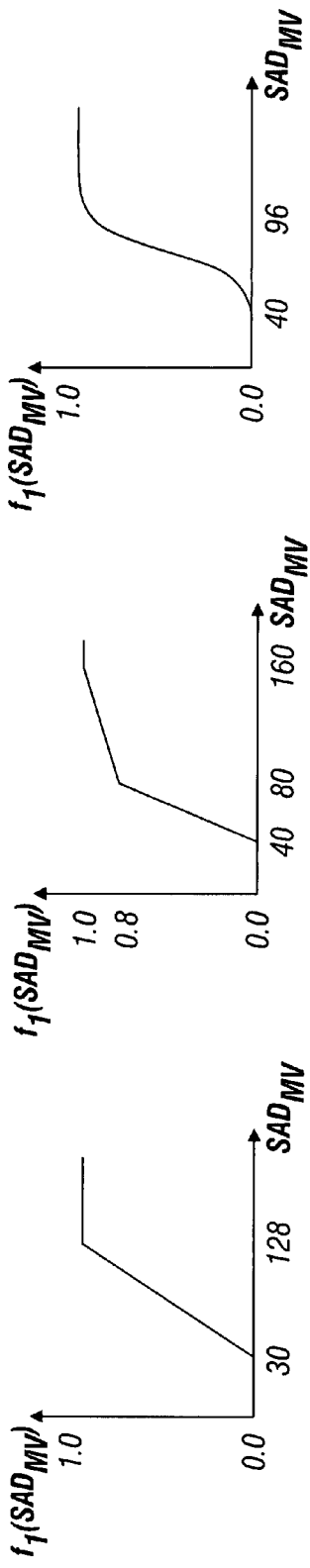
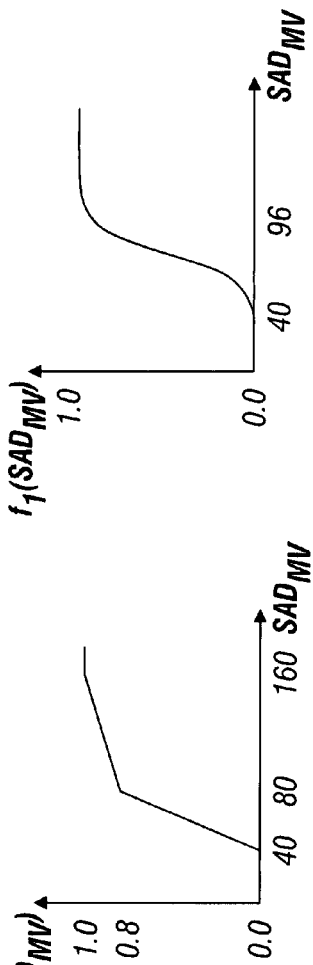
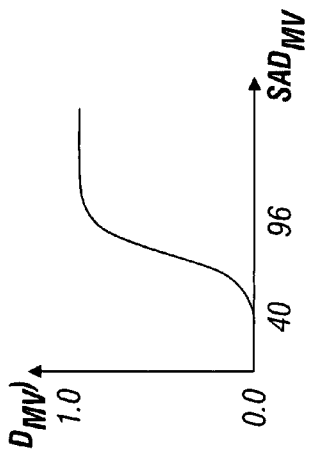
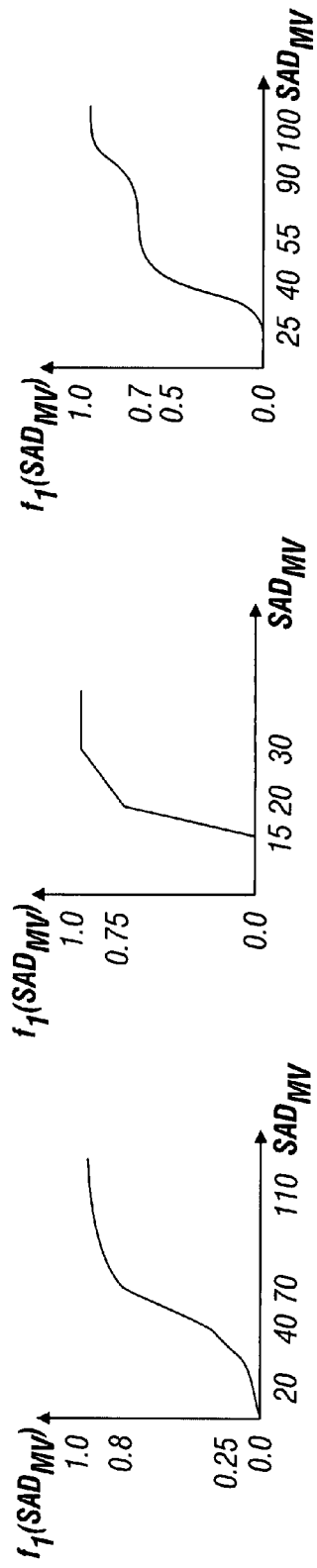
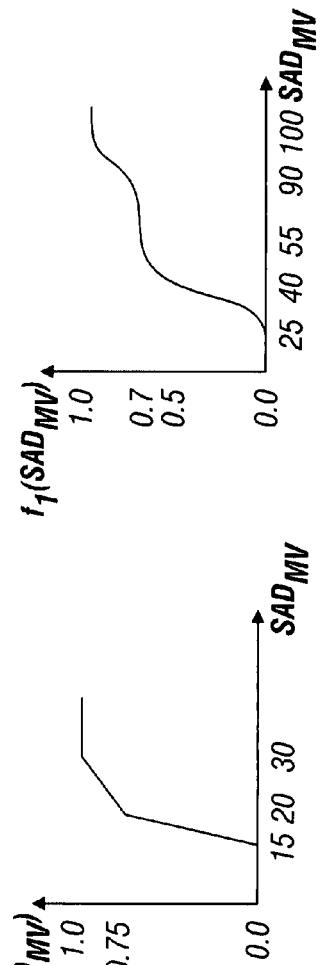
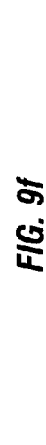

SYSTEM AND METHOD FOR INTRODUCING VIRTUAL ZERO MOTION VECTOR CANDIDATES IN AREAS OF A VIDEO SEQUENCE INVOLVING OVERLAYS

BACKGROUND OF THE INVENTION

1. Field of the Invention

The invention is related to video processing. More particularly, the invention is related to motion compensation and motion estimation algorithms.

2. Description of the Related Art

Multimedia processing systems, such as video encoders, may encode multimedia data using encoding methods based on international standards such as MPEG-x and H.26x standards. Such encoding methods generally are directed to compressing the multimedia data for transmission and/or storage. Compression is broadly the process of removing redundancy from the data. In addition, video display systems may transcode or transform multimedia data for various purposes such as, for example, to ensure compatibility with display standards such as NTSC, HDTV, or PAL, to increase frame rate in order to reduce perceived motion blur, and to achieve smooth motion portrayal of content with a frame rate that differs from that of the display device. These transcoding methods may perform similar functions as the encoding methods for performing frame rate conversion, de-interlacing, etc.

A video signal may be described in terms of a sequence of pictures, which include frames (an entire picture), or fields (e.g., an interlaced video stream comprises fields of alternating odd or even lines of a picture). A frame may be generally used to refer to a picture, a frame or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. Depending on context, a block may refer to either a macroblock or a subblock.

Video encoding methods compress video signals by using lossless or lossy compression algorithms to compress each frame or blocks of the frame. Intra-frame coding refers to encoding a frame using data from that frame. Inter-frame coding refers to predictive encoding schemes such as schemes that comprise encoding a frame based on other, "reference," frames. For example, video signals often exhibit temporal redundancy in which frames near each other in the temporal sequence of frames have at least portions that match or at least partially match each other. Encoders can take advantage of this temporal redundancy to reduce the size of encoded data.

Encoders may take advantage of this temporal redundancy by encoding a frame in terms of the difference between the frame and one or more reference frames. For example, video encoders may use motion estimation based algorithms that match blocks of the frame being encoded to portions of one or more other frames. The block of the encoded frame may be shifted in the frame relative to the matching portion of the reference frame. This shift is characterized by a motion vector. Any differences between the block and partially matching portion of the reference frame may be characterized in terms of what is referred to as a residual.

Reconstruction of the encoded frame involves a technique known as motion compensation. In motion compensation, the already decoded (reconstructed) pixels pointed to by the motion vector are added to the encoded difference or residual value resulting in the reconstructed pixels of the block. Decoding operations can also include creation of video frames between two or more already reconstructed frames. Frame rate conversion, de-interlacing and transcoding are examples of processes where decoder devices create new video data based on already reconstructed video data. These motion compensation techniques can use the encoded data, such as motion vectors and residual error, as well as the reconstructed video data for estimating the newly created frames. In addition, a a display device receiving uncompressed (or already decompressed) multimedia data may perform motion estimation and/or motion compensation techniques for transforming (e.g., frame rate conversion, de-interlacing, etc.) the multimedia data from one format to another format to be displayed.

One of the drawbacks of typical implementations of motion estimation and motion compensation schemes like block matching and optical flow is that these techniques usually estimate only one motion vector for every block or pixel. In most of the video sequences, this does not cause any problems. However, if the video sequence contains a semi-transparent overlay such as a menu, on-screen display (OSD), or logo, each block or pixel can be more efficiently represented by association with more than one motion vector. Such dual motion vector calculations greatly increase the computational complexity of the motion estimation and/or motion compensation schemes. Accordingly, a need exists for reducing complexity of searching for multiple motion vectors for the encoding and/or reconstruction of video data involving transparent overlays.

SUMMARY OF CERTAIN INVENTIVE ASPECTS

The systems and methods of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the sample features of this invention provide advantages that include more stable display of video including overlays, and more efficient representation of video including overlays.

An aspect provides a method of compressing video data. The method includes determining a first prediction of one or more pixel values in a first video frame based on one or more collocated pixel values in a second video frame, and determining a second prediction of the one or more pixel values in the first video frame based on one or more non-collocated pixel values in the second video frame. The method further includes determining a mixing weight factor to be used to combine the first and second predictions during reconstruction of the one or more pixel values.

Another aspect provides a method of video processing. The method includes receiving a first frame of video data, receiving a second frame of video data, wherein a first set of one or more pixel values of the second frame is predicted, using motion estimation, from a second set of one or more non-collocated pixel values of the first frame of video data. The method further includes determining a first prediction of a third set of one or more pixels of a third frame based on the motion estimation between the second frame and the first frame, determining a second prediction of the third set of one or more pixels of the third frame based on collocated pixels of the first frame and/or the second frame, and calculating values of the one or more identified pixels of the third set by combining the first prediction and the second prediction.

Another aspect provides a system for compressing video data. The system includes a motion estimation subsystem configured to determine a first prediction of one or more pixel values in a first video frame based on one or more collocated pixel values in a second video frame, and to determine a second prediction of the one or more pixel values in the first video frame based on one or more non-collocated pixel values in the second video frame. The system further includes a mixing factor computation subsystem configured to determine a mixing weight factor to be used to combine the first and second predictions during reconstruction of the one or more pixel values.

Another aspect provides a system for video processing. The system includes a receiver configured to receive a first frame of video data, and to receive a second frame of video data, wherein a first set of one or more pixel values of the second frame is predicted, using motion estimation, from a second set of one or more non-collocated pixel values of the first frame of video data. The system further includes a reformatting subsystem configured to determine a first prediction of a third set of one or more pixels of a third frame based on the motion estimation between the second frame and the first frame, to determine a second prediction of the third set of one or more pixels of the third frame based on collocated pixels of the first frame and/or the second frame, and to calculate values of the one or more identified pixels of the third set by combining the first prediction and the second prediction.

BRIEF DESCRIPTION OF THE DRAWINGS

FIGS. 9A to 9F show examples of a first function used in calculating mixing weight factors.

DETAILED DESCRIPTION OF CERTAIN INVENTIVE EMBODIMENTS

The following detailed description is directed to certain specific sample aspects of the invention. However, the invention can be embodied in a multitude of different ways as defined and covered by the claims. In this description, reference is made to the drawings wherein like parts are designated with like numerals throughout.

Video signals may be characterized in terms of a series of pictures, frames, or fields. As used herein, "frame" is a term that may encompass either frames or fields of a progressive video signal or frames or fields of an interlaced video signal.

Semi-transparent refers to opacity in a range from 0% (perfectly transparent) to 100% (perfectly opaque). As used herein, in keeping with current terminology in image/video processing and graphics, transparent may also convey a meaning that includes semi-transparent.

Embodiments of processing video data including motion estimation/compensation of portions of video with transparent overlays will be described. The processing can be performed in a video encoder, a video decoder, a video transcoder or a video display system. Embodiments using motion estimation/compensation with multiple prediction regions of a reference frame for representing a portion of video including a transparent overlay over a moving background are disclosed. In some embodiments, one of the prediction regions is a collocated region of a reference frame and another of the prediction regions is a non-collocated region of the reference frame. Methods of calculating a mixing weight factor used to combine the two prediction regions, for construction and/or reconstruction of the video portion containing the transparent overlay, are also disclosed.

Figure 1:
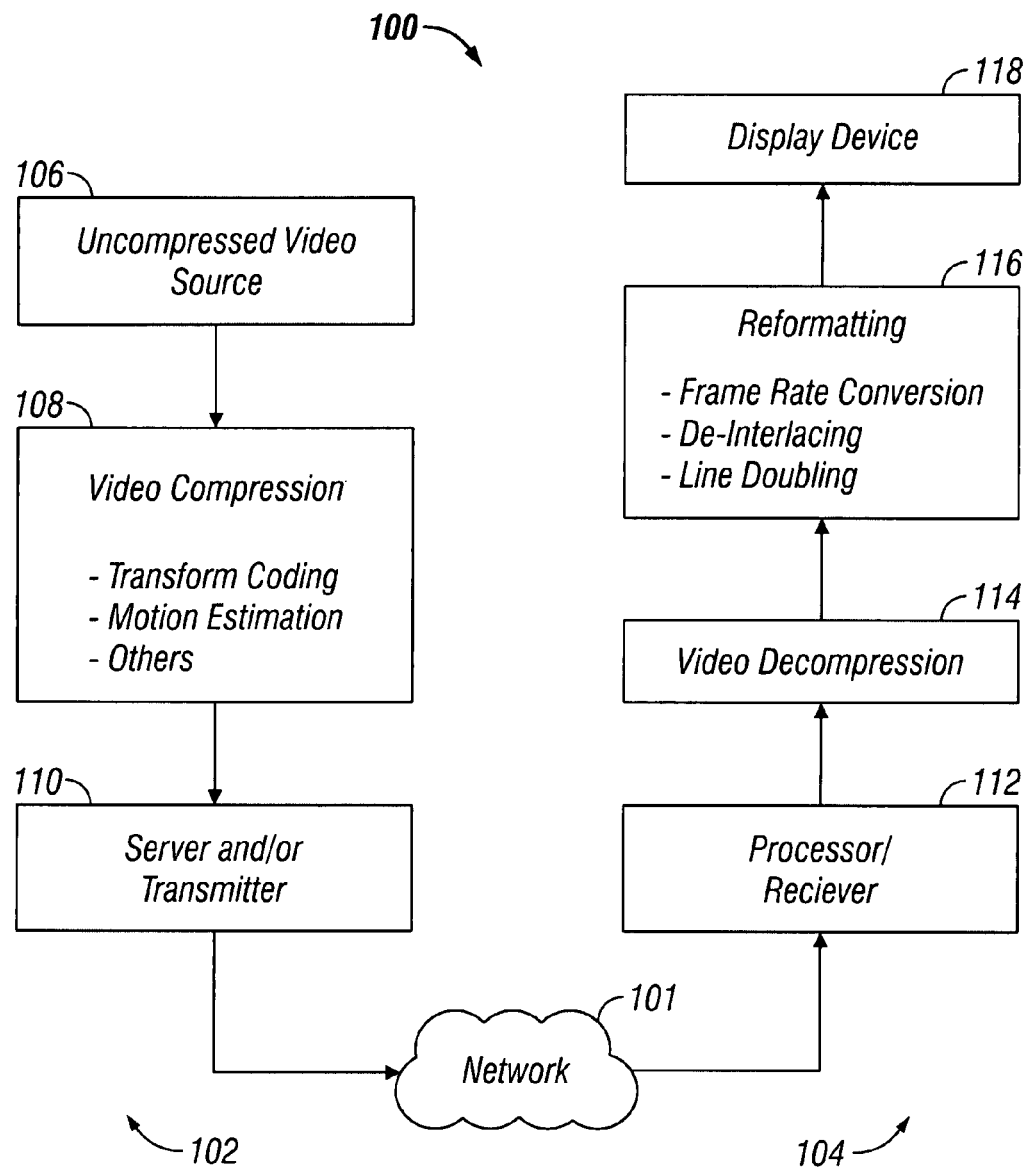
FIG. 1 is a functional block diagram of an exemplary communication system for encoding and decoding of compressed digital video data, according to one embodiment of the system and method.

FIG. 1 illustrates a functional block diagram of an exemplary communication system 100. The system 100 includes a video source 102 and video reception device 104. In this embodiment, the video source 102 obtains raw (uncompressed) video from an uncompressed video source 106, compresses it with a video compression element 108 and stores or communicates the compressed video data using a communication element 110. The video reception device 104 includes a processor and/or receiver 112, a video decompression element 114 and a reformatting subsystem 116. The compressed video can be communicated from the video source 102 to the video reception device 104 via a network 101.

The uncompressed video source 106 can be a video camera, or a memory device such as a disk drive. The uncompressed video source 106 provides uncompressed video data in the form of luminance and chrominance, or in individual color intensities such as red, green and blue, etc.

The video compression element 108 performs any of various video encoding techniques to remove the redundancy from the uncompressed video data. Transform coding may be used to remove higher spatial frequency components thereby removing spatial redundancy within a frame. Most video compression schemes involve a form of motion estimation such as block matching/motion compensated prediction or optical flow as well as others. The purpose of the motion estimation schemes is to remove the temporal redundancy between frames in a video sequence. Other forms of video compression known to skilled technologists may also be used in the video compression element 108.

The communication element 110 may be a server that is connected to the Internet and stores the compressed video. The communication element 110 may also be a transmitter that is configured to transmit the compressed video over the network 101. The network 101 may comprise one or more of a wireline or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a DMB (Digital Multimedia Broadcasting) system, an orthogonal frequency division multiple access (OFDM) system, or a DVB-H (Digital Video Broadcasting-Handheld) system.

The processor/receiver 112 of the video reception device 104 receives the compressed video over the network 101. In another embodiment, the processor/receiver accesses the compressed video from a memory storage device such as a DVD, a hard drive, a memory card, etc. The processor/receiver 112 can be included in a personal computer, a set top box, a handheld device, etc.

The video decompression element 114 decodes (e.g., decompresses) the received compressed video data. The video decompression element 114 reconstructs the video frames that were compressed in the encoding process. Reconstruction can include inverse transformation of transformed coefficients (e.g., discrete cosine transform (DCT), wavelet transform, etc.), reconstruction of spatially predicted data, and reconstruction of temporally predicted data. The video decompression element 114 can be part of the same device that contains the processor/receiver 112, or it can be a separate device. The video reception device 104 can be part of a set-top box, a DVD player, a PC, etc. In some embodiments, the video reception device 104 may receive uncompressed video (e.g., from the uncompressed video source 106). In these embodiments, the video decompression element 114 may be omitted.

The format of the reconstructed video output from the video decompression element 114 depends on the format that was encoded by the video encoder. For example, digital video formats can include different frame rates, different numbers of lines and rows of pixels, interlaced and non-interlaced, etc. For example, DVD's are typically encoded with 24 fps (frames per second) format, NTSC is 30 frames per second and PAL is 25 frames per second. The format may be interlaced or progressive. The reformatting subsystem 116 modifies the video signal to a format that fits the format of a display device 118 that is connected to the video reception device 104. The display device may be a television set (e.g., NTSC, PAL or HDTV), or a computer monitor running at frame rates such as 70 Hz, 75 Hz, 80 Hz, etc. The reformatting subsystem 116 may be part of the same device as the video decompression element 114 and/or the processor receiver 112. In some embodiments as discussed above, the video received by the video reception device 104 may be uncompressed video (e.g., from the uncompressed video source 106) and the video decompression element 114 is omitted. In these embodiments, the reformatting subsystem 116 reformats the uncompressed video.

The processes performed by the reformatting subsystem 116 can be very similar to the encoding schemes used to encode the compressed video data. Motion estimation/compensation can be used to create intermediate frames between reconstructed frames in order to enable frame rate conversion. Therefore, methods of spatial prediction and temporal prediction used in encoder devices can also be used in decoder devices for purposes of reformatting the video. The reformatting subsystem 116 can use reconstructed video data and/or compressed video data (e.g., motion vectors, residual error values, etc.) for performing the reformatting.

Figure 2:
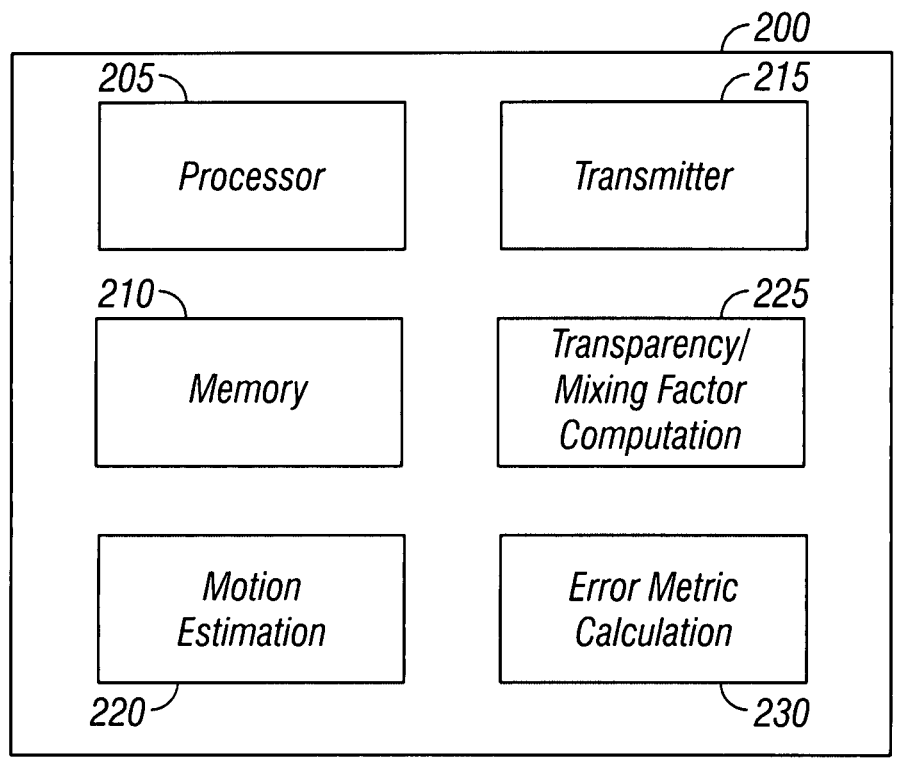
FIG. 2 is a block diagram illustrating an embodiment of a video source that may be used in a communication system such as illustrated in FIG. 1.

FIG. 2 is a block diagram illustrating an embodiment of a video source 200 that may be used in a communication system such as illustrated in FIG. 1. In this embodiment, the video source 200 comprises a processor element 205, a memory element 210, a transmitter element 215, a motion estimation element 220, transparency/mixing factor computation element 225, and an error metric calculation element 230. The processor 205 may include one or more of a general purpose processor and/or a digital signal processor and/or an application specific hardware processor. The memory 210 may include, for example, one or more of integrated circuits or disk based storage or any readable and writeable random access memory device. The processor 205 is coupled to the memory 210 and the other elements to perform the various actions of the other elements. The transmitter 220 transmits compressed video data over the network 101. In other embodiments, the transmitter 220 may be omitted and the compressed video data may be stored to the memory element 210 or one or more external memory devices including memory discs, memory cards, internet server memory, etc. The compressed video stored in the memory element 210 or in the external memory devices may be retrieved later by a video decoder device such as the video reception device 104 in FIG. 1.

The motion estimation element 220 performs any of various compression schemes that remove temporal redundancy from video sequences. The motion estimation element 220 estimates the motion of some or all of the pixels in a frame of video data under consideration from pixel data in other frames. The motion estimation element 220 assigns to one or more pixels, motion information, e.g., in the form of motion vectors representing the motion in two dimensions (e.g., horizontal and vertical) referenced to one or more other frames. Many techniques and algorithms exist to obtain the motion vectors, including block matching, optical flow, phase correlation and others. In general, any of the motion estimation techniques attempt to identify a set of pixels in one or more other frames which best match or combine to best match a similar portion of pixels in the current frame. The "best match" is generally decided in terms of a one or more error metrics.

The error metric calculation element 230 calculates the error metric used in conjunction with the motion estimation element 220. Error metrics that are commonly used include, for example, mean squared error (MSE), mean absolute error (MAE), peak signal to noise ratio (PSNR), sum of squared errors (SSE), sum of absolute difference (SAD), cross-correlation (CC), normalized cross-correlation (NCC), etc.

The transparency/mixing factor computation element 225 is used to determine motion estimation reference data used to represent areas of a frame that, in one embodiment, contain video data that exhibit transparent overlay characteristics. Normal motion estimation techniques may result in less data compression performance. A better match of a transparent overlay portion of video can often be obtained by the introduction of a second motion vector candidate. An exhaustive search of all possible pairs of motion vectors may not be viable due to excessive computational complexity. However, for the case of a transparent overlay, where the transparent overlay is substantially stationary from frame to frame, a simplification can be made. The simplification includes the introduction of a virtual zero motion vector as the second motion vector in areas involving overlays (without necessarily segmenting/identifying/extracting the overlay areas). The first prediction region, indicated by the first motion vector, will match a moving portion and the second portion, indicated by the virtual zero motion vector, will match the transparent overlay. The mixing factor computation element 225 uses various methods to determine an appropriate mixing of the moving prediction portion, as determined by the motion estimation element 220, with the collocated pixels of one or more other frames that make up the virtual zero motion vector prediction portion. In some embodiments, the mixing factor is determined based on the magnitudes of two error metrics. The two error metrics are related to the two prediction regions, the motion estimation portion and the collocated portion. Details of the methods used to determine the mixing factor are discussed below.

In some embodiments, one or more of the elements of the video source 200 of FIG. 2 may be rearranged and/or combined. The elements may be implemented by hardware, software, firmware, middleware, microcode or any combination thereof. Details of the actions performed by the elements of the video source 200 will be discussed in reference to the method illustrated in FIG. 4 below.

Figure 3:
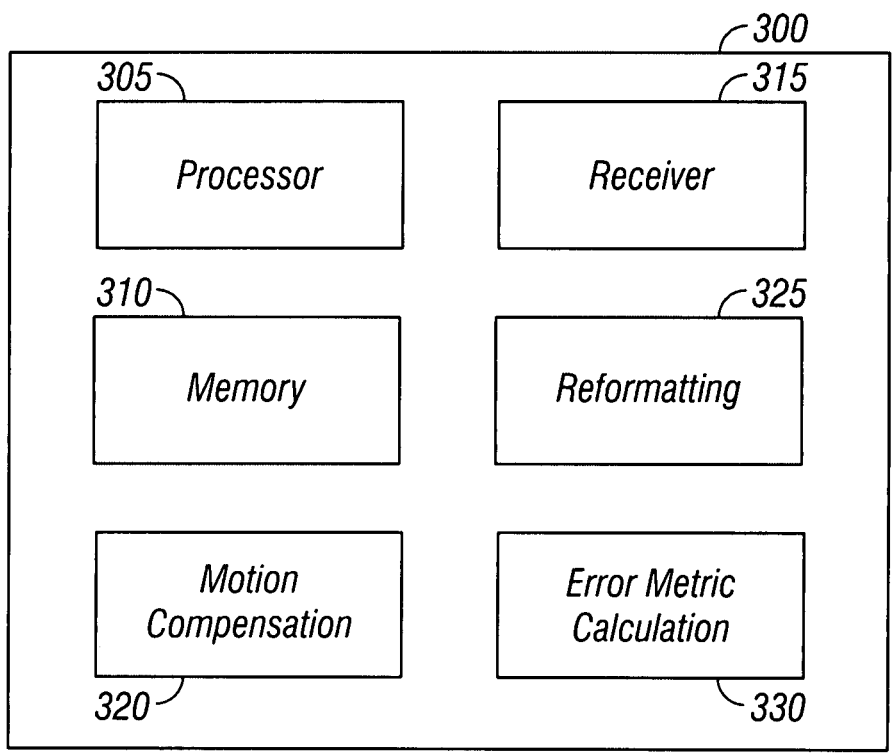
FIG. 3 is a block diagram illustrating an embodiment of a video reception device that may be used in a communication system such as illustrated in FIG. 1.

FIG. 3 is a block diagram illustrating an embodiment of a video reception device 300 that may be used in a communication system such as illustrated in FIG. 1. In this embodiment, the video reception device 300 comprises a processor element 305, a memory element 310, a receiver element 315, a motion compensation element 320, a reformatting element 325, and an error metric calculation element 330. The processor 305 may include one or more of a general purpose processor and/or a digital signal processor and/or an application specific hardware processor. The memory 310 may include, for example, one or more of integrated circuits or disk based storage or any readable and writeable random access memory device. The processor 305 is coupled to the memory 310 and the other elements to perform the various actions of the other elements. The receiver 315 receives video data over the network 101. In other embodiments, the receiver 315 may be omitted and the video data may be retrieved from the memory element 310 or one or more external memory devices including memory discs, memory cards, internet server memory, etc. The video data received over the network 101 or retrieved from the memory element 310 or from external memory devices may be compressed or uncompressed video data. In the case of compressed video data stored in the memory element 310 or in the external memory devices, the compressed video data may have been created at an earlier time by an encoding device such as the video source 102 in FIG. 1.

In some embodiments, the motion compensation element 320 reconstructs portions of video that are encoded with any of various motion estimation schemes that remove temporal redundancy from video sequences as discussed above. In these embodiments, reference frames previously reconstructed by the motion compensation element 320 may be used by the reformatting element 325, along with motion estimation data such as motion vectors, to construct other frames or portions of video data in reference to the reconstructed reference frames. In one embodiment, a motion vector is used to locate a portion of the reconstructed reference frame that is used to construct the portion of the other frame. A residual error may be added to the reference portion in order to make up the difference between the "best matching" portion or portions and the original uncompressed video data.

In other embodiments, the motion compensation element 320 may perform motion estimation on un-encoded (e.g., uncompressed or decompressed) portions of video to obtain motion estimation data such as motion vectors. In these embodiments, the motion estimation data obtained from the uncompressed frames by the motion compensation element 320 may be used by the reformatting element 325, along with the uncompressed video data, to construct other frames or portions of video data. For example, the video reception device 300 may receive uncompressed (or decompressed) video from a DVD player at a first frame rate and construct other frames to be displayed at a second frame rate.

The reformatting element 325 is used to reformat the reconstructed video data in order to display it on a video display device with certain video format requirements, e.g., frame rate, numbers of pixels per row and/or column, etc. The reformatting element 325 can perform functions as discussed above in reference to the reformatting subsystem 116 of the video source 102. In one embodiment, the reformatting element 325 creates one or more new frames between the reconstructed frames in order to match a frame rate of the display device. Motion estimation techniques, similar to those discussed above in reference to encoding, may also be used to create the intermediate frames of frame rate conversion. In one embodiment, a portion of the intermediate frame is created in a manner similar to the encoding of the transparent overlay portion as discussed above. The reformatting, in this embodiment, includes identifying a first motion compensated prediction region and identifying a second prediction region with a virtual zero motion vector (without necessarily segmenting/identifying/extracting the overlay areas). The first prediction region, may be identified by a motion vector used in motion estimation/compensation between the reconstructed frames. The second prediction region, as referenced by the virtual zero motion vector can be located in one or both of the reconstructed frames.

As discussed above in reference to the transparency/mixing factor computation element 225, the reformatting element 325 may use various methods to determine an appropriate mixing of the motion compensated prediction portion with the collocated pixels of one or more other frames that make up the virtual zero motion vector prediction portion. In some embodiments, the mixing factor is determined based on the magnitudes of two error metrics. The two error metrics are related to the two prediction regions, the motion estimation portion and the collocated portion. The reformatting element 325 can use uncompressed or reconstructed video data and motion estimation data (e.g., motion vectors, residual error values, etc.) for performing the reformatting. Details of the methods used by the reformatting element 325 are discussed below.

The error metric calculation element 330 calculates the error metric used in conjunction with the motion reformatting element 325. Error metrics that are commonly used include, for example, mean squared error (MSE), mean absolute error (MAE), peak signal to noise ratio (PSNR), sum of squared errors (SSE), sum of absolute difference (SAD), cross-correlation (CC), normalized cross-correlation (NCC), etc.

In some embodiments, one or more of the elements of the video reception device 300 of FIG. 3 may be rearranged and/or combined. The elements may be implemented by hardware, software, firmware, middleware, microcode or any combination thereof. Details of the actions performed by the elements of the video reception device 300 will be discussed in reference to the methods illustrated in FIG. 7 below.

Encoding/Compressing Video Containing Transparent Overlays

Figure 4:
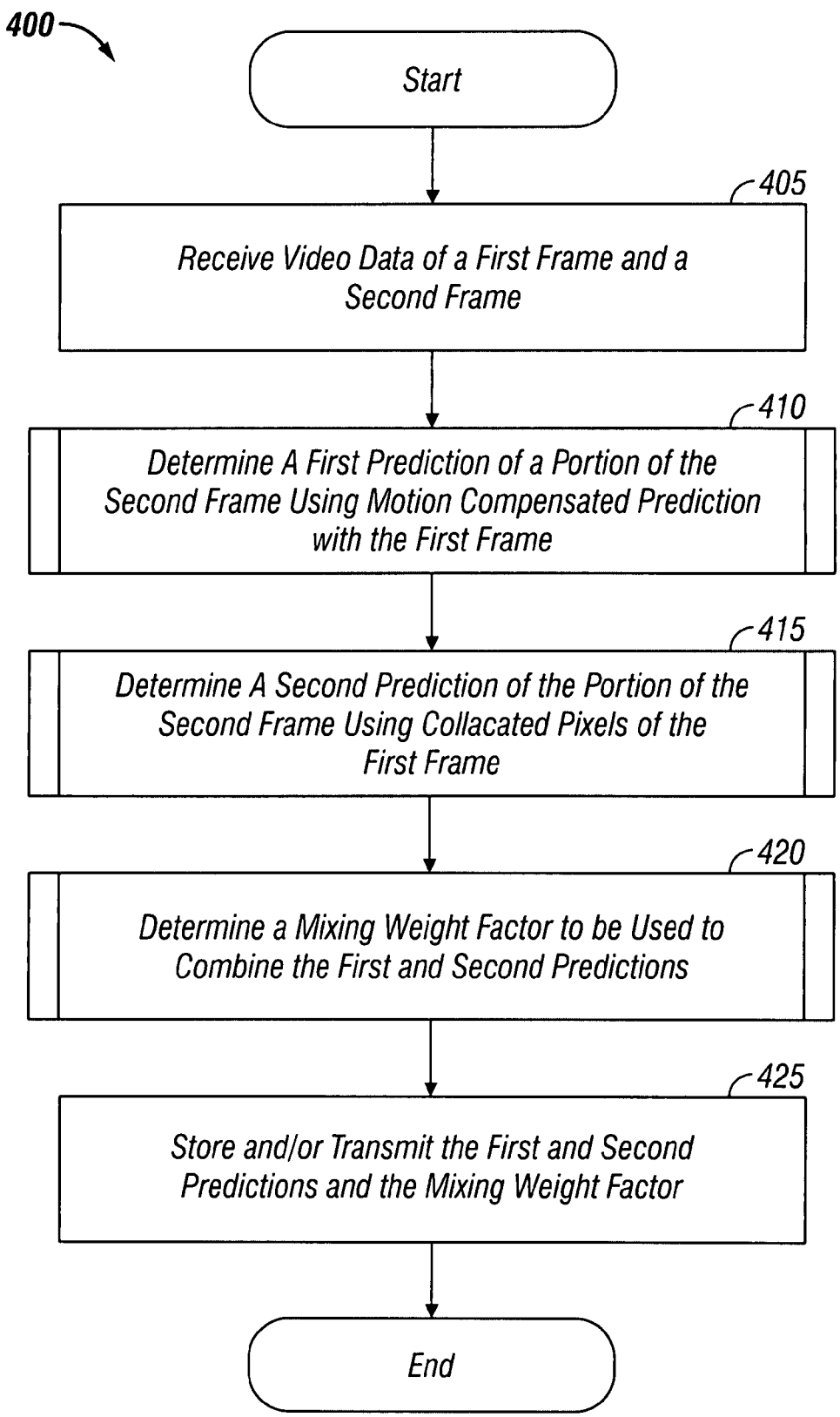
FIG. 4 is a flowchart illustrating an example of a method of encoding compressed video in a system such as illustrated in FIG. 1.

FIG. 4 is a flowchart illustrating an example of a method of encoding compressed video in a system such as illustrated in FIG. 1. Process 400 is used, in one embodiment, for encoding a portion of video data including a transparent overlay, where the encoding uses two prediction regions as discussed above. For purposes of clarity, the process 400 will be described assuming motion estimation from one preceding frame, though those of skill in the art will recognize that the process 400 is not limited to this case.

Figure 5:
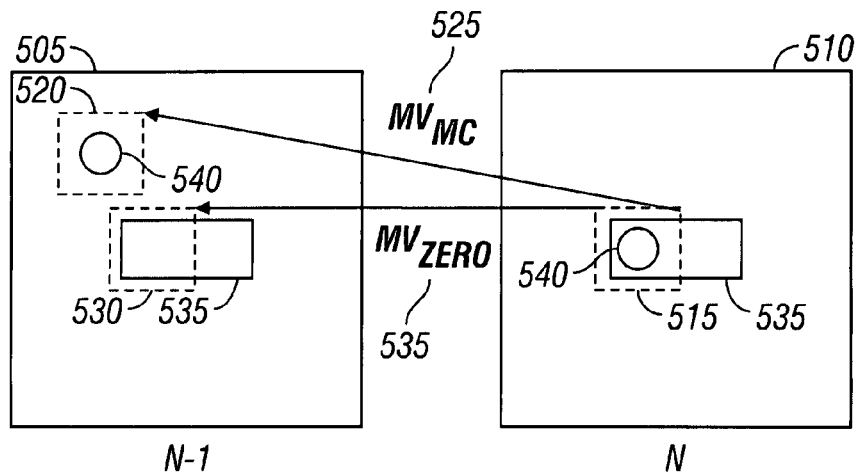
FIG. 5 is an illustration of an example of motion compensated prediction that may be used in the method illustrated in FIG. 4.

FIG. 5 is an illustration of an example of motion compensated prediction that may be used in the process 400 illustrated in FIG. 4. With reference to FIGS. 4 and 5, the process 400 starts at block 405 where a first frame 505 and a second frame 510 of video data are received (e.g., received over a network, from memory, etc). The first frame 505 and the second frame 510 are uncompressed video data. The video data may include luminance and/or chrominance, red, green and blue intensities as well as other representative forms of image and/or video data. In this example, a portion 515 of the second frame 510 will be predicted in reference to the first frame 505. The prediction will include two prediction regions of the first frame 505 that are combined to closely predict a region that may include a transparent overlay. The first prediction region 520, determined at block 410, is determined using motion compensated prediction (e.g., motion estimation) based on the first frame 505. The two dimensional relative location of the first prediction 520 in the first frame 505 relative to the portion 515 being predicted for in the second frame 510 is contained in a motion vector 525 labeled $MV_{mc}$ (where "mc" stands for motion compensated). A second prediction region 530 in the first frame 505 is collocated with the portion 515 of the second frame 510 as indicated by a virtual zero motion vector 535, labeled $MV_{Zero}$. The virtual zero motion vector 535 can be encoded as a standard motion vector referenced to the first frame 505 (e.g., frame sequence number N-1 in this example) with zero entries for two dimensional displacements dx and dy.

Many techniques and algorithms exist to determine the best matching region 520 and the corresponding motion vector $MV_{mc}$, of which, block matching based methods form a commonly used subset. The basic principle of block matching is to find a block (a group of one or more pixels aligned in some pre-determined fashion; examples include rectangular, triangular, diamond shaped blocks) of data in the previous frame which best matches a block in the current frame, the "best match" being decided in terms of a chosen metric such as mean squared error (MSE), mean absolute error (MAE), peak signal to noise ratio (PSNR), sum of squared errors (SSE), sum of absolute difference (SAD), cross-correlation (CC), normalized cross-correlation (NCC), etc. All pixels in the block thus have the same motion vector. Various other techniques like optical flow also exist which determine the motion vector for a pixel or a block based on error metrics, examples of which are listed above. An example case of block matching using rectangular blocks with the SAD used as the error metric will now be described though other error metrics can be used, depending on the embodiment.

Figure 6:
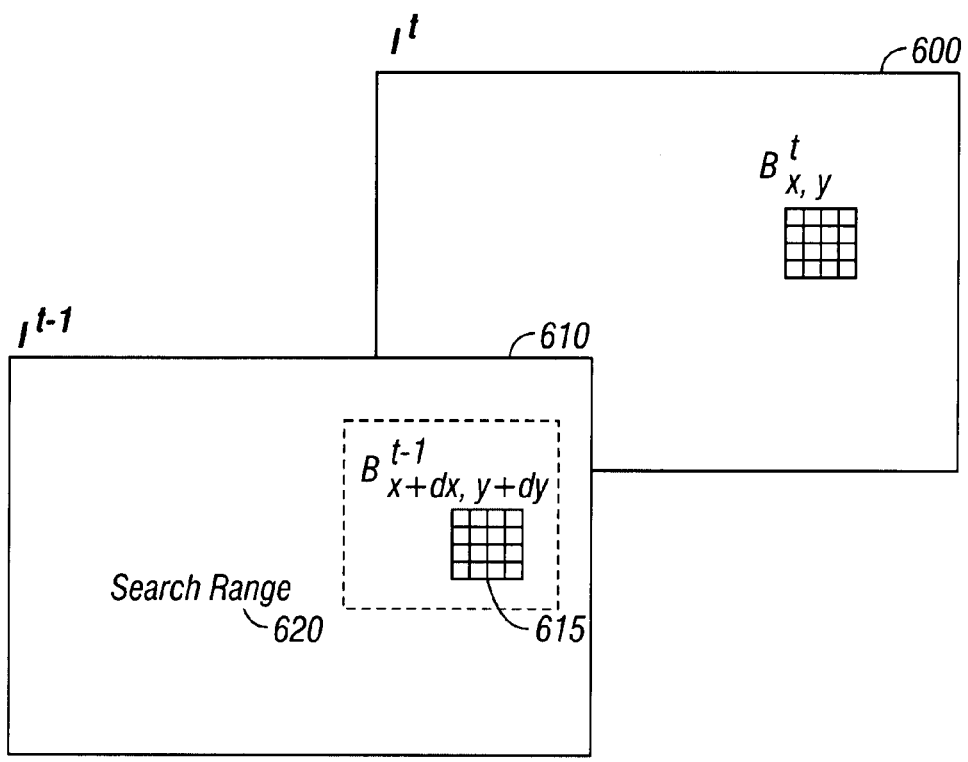
FIG. 6 is an illustration of an example of block matching that may be used in the method illustrated in FIG. 4.

FIG. 6 is an illustration of an example of block matching that may be used in determining the first prediction at the block 410 in the method illustrated in FIG. 4. A first block 605 (the block 605 is labeled $B_{x,y}^t$) has a top-left corner at location (x, y) in a current frame 600 being predicted from a previous frame 610 (the first frame 600 is labeled $I^t$ and the previous frame 610 is labeled $I^{t-1}$), where the first block 605 is of size m×n pixels. A second block 615 located in the previous frame 610, and labeled $B_{x+dx,y+dy}^{t-1}$ represents a reference block displaced from location (x, y) by (dx, dy) in the previous frame 610. The second block 615 is also of size m×n pixels. The SAD error metric between the first block 605 and the second block 615 for the motion vector (dx, dy) is given by the expression:

$$SAD(dx, dy) = \sum_{i=0}^{m-1} \sum_{j=0}^{n-1} |B_{x,y}^t(i, j) - B_{x+dx,y+dy}^{t-1}(i, j)| \quad (1)$$

where $B_{x,y}^t(i, j)$ represents pixel (i, j) within the first block 605 (i=0, m-1 and j=0, n-1) and $B_{x+dx,y+dy}^{t-1}(i, j)$ represents the corresponding pixel (i, j) in the second block 615. In one embodiment, an exhaustive search of all the possible reference blocks in the previous frame 610 is made in search of the "best matching" block resulting in the minimum SAD metric as computed in equation (1). In another embodiment, a limited search range 620 surrounding the location of the block 605 in the previous frame 610 is searched and the "best matching" block 615 within the limited search range 620 is chosen. The "best matching" block 615 with the smallest SAD value is thus determined to be the first prediction region at the block 410. The motion estimation element 220 of the video source 200 can perform the functions at the block 410 of the process 400.

After determining the first prediction region 520 at the block 410, the process 400 continues at block 415 where a second prediction region 530 (FIG. 5) that comprises pixels collocated with the block 515 in the second frame 510. At least a portion of the collocated prediction region 530 will match reasonably well with a portion of the block 515 if the prediction region 530 and the block 515 being predicted both include a stationary portion (such as a stationary transparent overlay). In the example shown in FIG. 5, the second prediction region 530 and the block 515 being predicted both comprise a portion of a stationary transparent overlay 535. However, the block 515 being predicted also includes a circular portion 540 of moving background. In the first frame 505, the circular background 540 is outside of the overlay region 535, but in the current frame 510, the circular background 540 is within the overlay region 535. Thus, the circular background of the block 515 will introduce some error in the error metric of the motion estimated first prediction region 520 (e.g., the SAD as calculated using Equation 1 with the motion vector $MV_{mc}$). However, the circular background 540 contained in to be the "best matching" motion estimated block in step 410, will match reasonably well with the block 515 since it also contains the circular background 540. Likewise, the portion of the overlay region 535 contained in the block 515 will introduce some error into the error metric (e.g., the SAD as calculated using Equation 1 above with the virtual zero motion vector $MV_{zero}$) between the block 515 and the first motion estimated prediction region 520. Therefore, neither the error metric between the block 515 and the first prediction region 520 nor the error metric between the block 515 and the second collocated second prediction 530 will be very good, but they may be better when combined. By combining the motion estimated first prediction region 520 and the zero motion vector (collocated) second prediction region 530 with the proper mixing weight factor, a combined error metric may be smaller that either of the two error metrics corresponding to the first and second prediction regions alone. The motion estimation element 220 of the video source 200 in FIG. 2 can perform the functions at the block 415 in the process 400.

After identifying the first prediction region 520 and the second prediction region 530, the process 400 continues at block 420, where the mixing weight factor to be used to combine the first and second predictions is determined. The use of a mixing weight factor is one method of creating a portion of video including a transparent overlay portion and a moving background portion. One method of creating a frame with-transparent overlay and utilizing a mixing weight factor "α" is described by the following equation:

$$I(i, j) = \begin{cases} (\alpha \cdot I_{overlay}(i, j)) + ((1-\alpha) \cdot I_{background}(i, j)) & (i, j) \in \Omega \\ I_{background}(i, j) & \text{otherwise} \end{cases} \quad (2)$$

where Ω defines the region of support (a portion of a frame containing the overlay) of the overlay and α∈ (0, 1) is the transparency/mixing ratio. An α=0 corresponds to a completely clear overlay and an α=1 corresponds to a completely opaque overlay. The transparency/mixing factor computation element 225 of the video source 200 in FIG. 2 can perform the functions at the block 420 of the process 400.

At block 425, encoded data (e.g., motion vectors and residual error values) of the first prediction region, the second determined region and the mixing weight factor "α" can be stored into memory (e.g., the memory element 210 in FIG. 2) and/or transmitted across a network (e.g., the network 101 in FIG. 1). This encoded information will enable a decoding device that has reconstructed the first and second prediction regions 520 and 530 of the first frame 505, to reconstruct the block 515 of the second frame 510. The processor 205 or the transmitter 215 of the video source 200 in FIG. 2 can perform the storing or transmitting functions, respectively, at the block 425 of the process 400.

It should be noted that some of the blocks of the process 400 may be combined, omitted, rearranged or any combination thereof.

Decoding/Reformatting Video Containing Transparent Overlays

Figure 7:
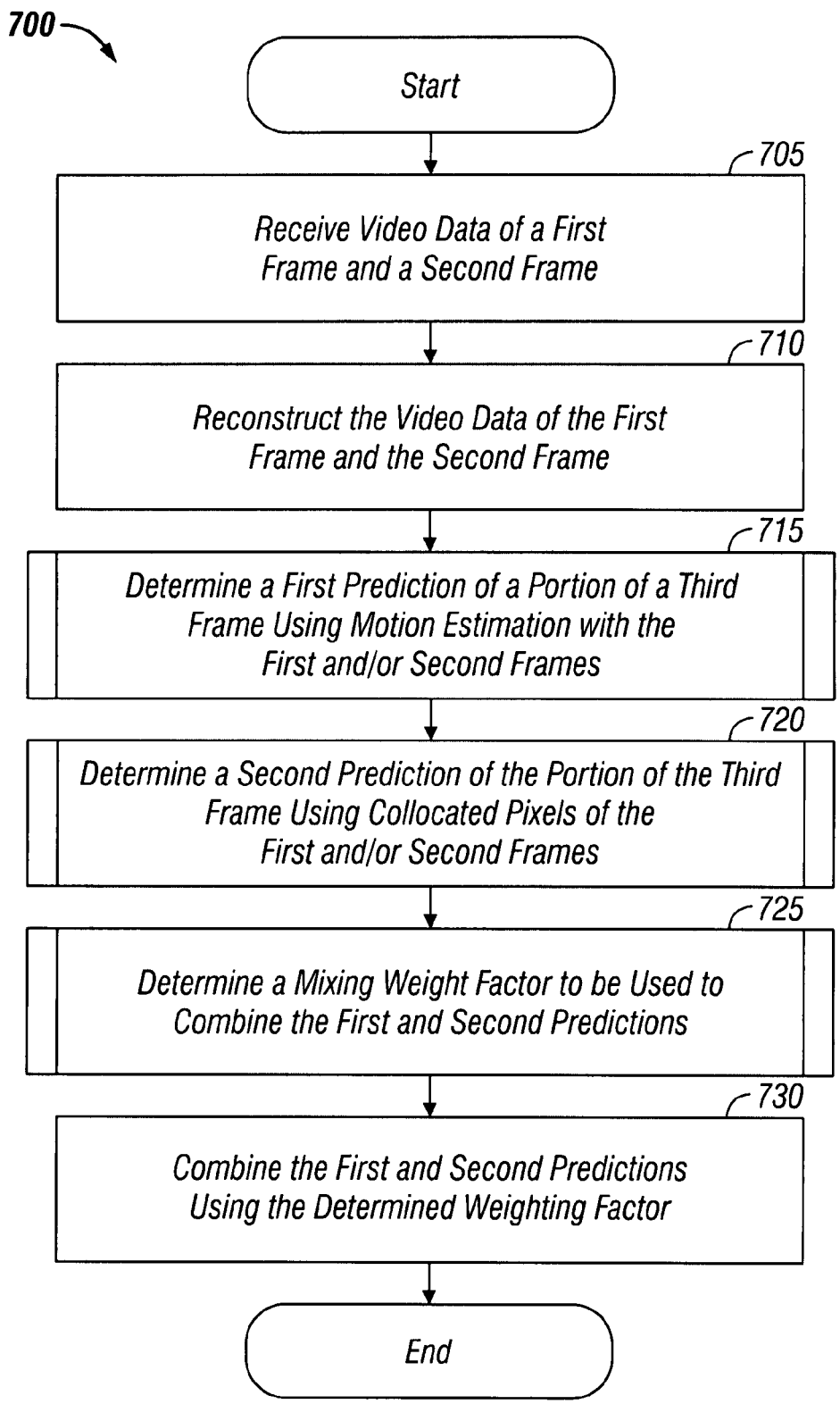
FIG. 7 is a flowchart illustrating an example of a method of reformatting reconstructed video in a system such as illustrated in FIG. 1.

FIG. 7 is a flowchart illustrating an example of a method of reformatting reconstructed video in a system such as illustrated in FIG. 1. Process 700 is used, in one embodiment, for reformatting a portion of video data including a transparent overlay, where the encoding uses two prediction regions as discussed above. For purposes of clarity, the process 700 will be described assuming that a first frame of received video data is compressed using motion estimation from one preceding frame, though those of skill in the art will recognize that the process 700 is not limited to this case.

Figure 8:
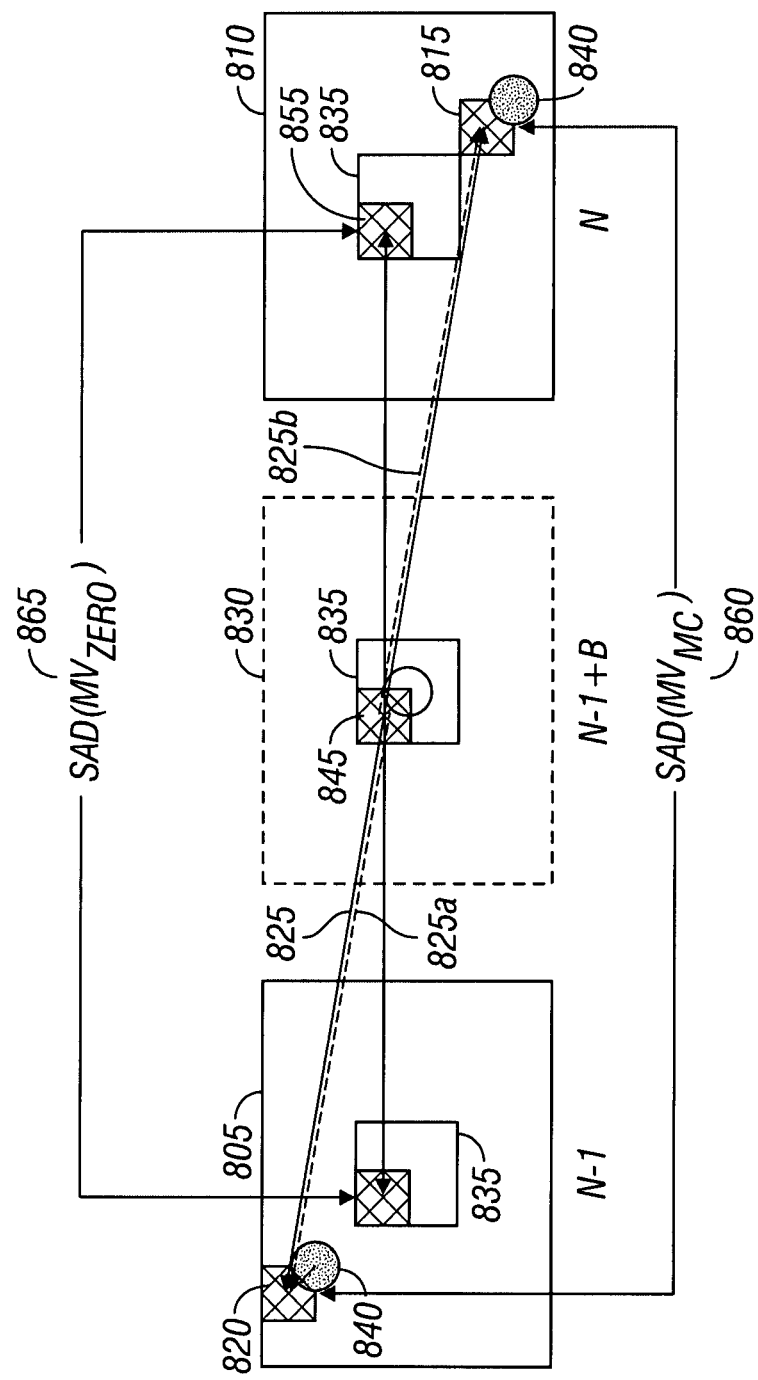
FIG. 8 is an illustration of an example of reformatting a portion of video as used in the method illustrated in FIG. 7.

FIG. 8 is an illustration of an example of reformatting a portion of video as used in the method illustrated in FIG. 7. With reference to FIGS. 7 and 8, the process 700 starts at block 705 where a first frame 805 and a second frame 810 of video data are received (e.g., received over a network, from memory, etc). In this example, the first frame 805 and the second frame 810 are received as compressed video data. The compressed video data may represent luminance and/or chrominance, red, green and blue intensities as well as other representative forms of image and/or video data. The first and second frames 805 and 810, respectively, can include intra-coded data, and inter-coded data. The inter-coded data can include portions inter-coded using motion estimation from one or more other frames. For example, a block 815 of the frame 810 is predicted using motion estimation in reference to the "best matching" block 820 of the frame 805. The inter-coded data representing the block 815 includes, in this embodiment, a motion vector $MV_{mc}$ 825 containing the two dimensional displacement vector (dx, dy) and the reference frame number "N−1" of the frame 805 as well as residual error data representing the difference between the video data of the reconstructed reference block 820 and the original uncompressed video data of the predicted block 815. The receiver element 315 of the video reception device 300 in FIG. 3 can perform the functions of the block 705 of the process 700.

The process 700 continues at block 710, where the first and second frames 805 and 810, respectively, are reconstructed or decompressed. Intra-coded frames, or portions of frames, can be reconstructed without reference to other frames. Inter-coded frames, or portions of frames, are reconstructed by reconstructing other frames (or portions of frames) upon which they depend first and subsequently using the reconstructed portions that are referenced (e.g., as indicated by motion vectors) and adding residual error values to the referenced portions. For example, the block 815 is formed by locating the reconstructed block 820 in frame 805 with the motion vector 825. The one or more pixel values of block 820 are then added to the residual error value corresponding to the block 815. Thus, the block 815 is reconstructed. The motion compensation element 320 of the video reception device 300 in FIG. 3 can perform the functions of the block 710 in the process 700. In some embodiments, the video data received at the block 705 is uncompressed video data. In these embodiments, the reconstruction or decompression at the block 710 is omitted.

In the example shown in FIG. 8, the process 700 is being used to create a new frame 830 between the frames 805 and 810. A frame, such as the frame 830, may be created in frame rate conversion operations, such as, for example, in a 2-3 pull down operation. In other embodiments, a portion of an intermediate frame, such as the frame 830, will be created in a de-interlacing operation. The frame 830 is located at a time point N−1+β (where 0<β<1) between the frame 805 at time N−1 and the frame 810 at the time point N. The frames 805 and 810 contain a transparent overlay region 835 and a circular moving object 840. In this example, the frame 830 lies in the middle (β=0.5). Assuming that the moving object 840 moves at a uniform speed, the moving object 840 is located behind the transparent overlay 835 in the frame 830. In order to create this situation accurately, two portions of the frame 805 and/or the frame 810 can be used. A first prediction region includes a portion of the moving object 840 and a second prediction region includes a portion of the transparent overlay 835.

The first prediction region is determined at block 715 of the process 700. In some embodiments, where compressed video is received at the block 705, the motion vector 825 that was used to reconstruct block 815 in reference to the block 820 in the frame 805 is interpolated to identify the location of the block 845 in the frame 830 in this example. In other embodiments, where uncompressed or decompressed video is received at the block 705, the motion vector 825 may be determined using motion estimation techniques as discussed above. In these embodiments, the motion compensation element 320 of the video reception device 300 in FIG. 3 may perform the motion estimation functions. The motion vector 825 can be interpolated temporally to correspond to the location of the frame 830 at the time point B, between the frames 805 and 810. Two motion vectors 825A and 825B can be interpolated from the motion vector 825. The motion vector 825A, pointing to the block 820 in the frame 805, can be calculated by multiplying the displacements (dx, dy) of the motion vector 825 by the value of β resulting in (β*dx, β*dy). The motion vector 825B, pointing to the block 815 in the frame 810, can be calculated by multiplying the displacements (dx, dy) of the motion vector 825 by the value of (1−β) resulting in ((1−β)*dx, (1−β)*dy). Calculation of either of the motion vectors 825A or 825B in this way will identify the location of the block 845 in the frame 830. Either one or both of the motion vectors 825A and 825B can be used to predict the block 845 in the frame 830. Using only the motion vector 825A will result in using only the block 820 as the first prediction. Using only the motion vector 825B will result in using only the block 815 as the first prediction. In one embodiment, both of the motion vectors 825A and 825B are used and the blocks 820 and 815 are averaged to form the first prediction. at the block 715 of the process 700. The reformatting element 325 of the video reception device 300 in FIG. 3 can perform the functions at block 715 of the process 700.

The process 700 continues at block 720 where the second prediction region (representing the transparent overlay 835 in this example) is determined. The second prediction region is determined based on the location of the pixels in the block 845 as identified by the interpolated motion vectors 825A and/or 825B. A virtual zero motion vector is used to form the second prediction for the block 845 using collocated pixels in the frame 805 and/or the frame 810. In one embodiment, the collocated pixels of the frame 805, in block 850, are determined to be the second prediction referenced by the virtual zero motion vector. In another embodiment, the collocated pixels of the frame 810, in block 855, are determined to be the second prediction referenced by the virtual zero motion vector. In yet another embodiment, the collocated blocks 850 and 855 are combined to determine the second prediction. The reformatting element 325 of the video reception device 300 in FIG. 3 can perform the functions at block 720 of the process 700.

Subsequent to determining the first prediction region and the second prediction region, the process 700 continues at block 725, where the mixing weight factor to be used to combine the first and second predictions is determined. In one embodiment, the mixing weight factor is determined to provide a transparent overlay as described by equation (3) above. In equation 3, a mixing factor α=0 corresponds to a completely clear overlay and an α=1 corresponds to a completely opaque overlay. Methods of choosing the mixing weight factor "α" at block 725 will be discussed below. The reformatting element 325 of the video reception device 300 in FIG. 3 can perform the functions at the block 725 of the process 700.

Subsequent to determining the mixing weight factor at the block 725, the process 700 continues at block 730, where the first and second predictions are combined using the determined mixing weight factor. The first and second predictions can be combined using the equation (2) above where $I_{background}(i, j)$ represents the pixel values of the first prediction determined at the block 715, $I_{overlay}(i, j)$ represent s the pixel values of the second prediction determined at the block 720, and α represents the mixing weight factor determined at the block 725. The pixel values may be one or more of luminance, chrominance, colors (e.g., red, green and blue), etc. Thus, the block 845 is created in the intermediate frame 830 to include portions of both the transparent overlay 835 and the moving object 840.

It should be noted that some of the blocks of the process 700 may be combined, omitted, rearranged or any combination thereof.

Transparent Overlay Mixing Weight Factor Calculation

Methods of calculating the mixing weight factor used to combine the first and second predictions determined in the processes 400 and 700 above will now be discussed. In reference to FIG. 6, in typical video sequences, when the motion of a block $B_{x,y}^t$ (605) in the current frame $I^t$ (600) is correctly estimated, the correspondence of the pixels belonging to the block with those in the matched block $B_{x+dx,y+dy}^{t-1}$ (615) in the previous frame $I^{t-1}$ (610) is good, and the computed error metric between the two blocks 605 and 610, e.g., the SAD, is small. But in the case of a block containing a semi-transparent overlay over some moving background, a single motion vector may not accurately describe the motion of all the pixels in the block. If a pixel follows the motion of the background, then some error is introduced since the overlay, which contributes a certain percentage of the pixel value, is not matched. On the other hand, if a pixel is assigned a zero motion vector, then some error is introduced due to the mismatch in the background information. Typically, the former occurs more frequently and is more detrimental to output video quality (causes annoying visual artifacts of distortion and shaking/flicker of the semi-transparent overlay image) than the latter (some smoothing/blurring of the image behind the overlay). Due to the error in the match, $SAD_{MV}$, the computed SAD between the blocks corresponding to the motion vector describing the motion of the background is large (relative to matched blocks without overlays) as is $SAD_{Zero}$, the SAD between the blocks corresponding to the zero motion vector. However, in cases involving transparent overlays, $SAD_{MV}$ and $SAD_{Zero}$ are of comparable magnitude. Therefore, blocks having a relatively large value of $SAD_{MV}$, but comparable values of $SAD_{MV}$ and $SAD_{Zero}$, are areas where a transparent overlay is possibly present.

The methods of calculating the mixing weight factor, as discussed below, are applicable to both the encoding process 400 and the decoding/reformatting process 700 discussed above. The methods can be performed in the block 420 of the process 400 in order to better predict the video being compressed by the process 400 when transparent overlays are present. The methods can also be performed in the block 725 of the process 700 in order to create a more stable reformatted video sequence when transparent overlays are present. The methods discussed below are specific to the process 700. However, a skilled technologist can readily use the same methods for other processes such as the process 400 above. The variables used for describing the methods of calculating the mixing weight factor are listed in Table 1.

TABLE 1

| Variable | Description |
|---|---|
| $I^t(i, j)$ | Collocated Pixel values in a first frame (see frame 810 in FIG. 8) contributing to the first prediction. |
| $I^{t-1}(i, j)$ | Collocated Pixel values in a second frame (see frame 805) contributing to the first prediction. |
| $I_{mc}^{tt}(i, j)$ | Motion compensated pixel values of the second prediction. |
| $I_{out}^{tt}(i, j)$ | Output pixel values resulting from combining the first and second predictions. |
| $\alpha_{mix}$ | Mixing weight factor used to combine the first and second predictions. |
| β | The time point between the two reconstructed frames (see frames 805 and 810) where a third frame is being reformatted (see Frame 830). 0 < β < 1 |

The methods discussed above combine some stationary temporal content (referenced by the virtual zero motion vector) and some motion-compensated content (e.g., as determined using motion compensated prediction). A simple procedure for this mixing is shown in Equation (3) below:

$$I_{out}^{tt}(i, j) = \left(\alpha_{mix} \cdot \frac{I^t(i, j) + I^{t-1}(i, j)}{2}\right) + ((1 - \alpha_{mix}) \cdot I_{mc}^{tt}(i, j)) \quad (3)$$

where tt=β·t, 0.0≤β≤1.0, represents a time index in the interval [t−1, t], $\alpha_{mix}$ is the mixing weight and $I_{mc}^{tt}(i, j)$ is the motion-compensated output obtained using the motion vector MV applicable to pixel location (i, j) (see discussion above in reference to the block 715 of the process 700). In one embodiment, the motion vector MV is estimated by a video encoder between the frames $I^t$ and $I^{t-1}$ in an encoding process such as the process 400 above. One method of computing $I_{mc}^{tt}(i, j)$ is given in the following equation.

$$I_{mc}^{tt}(i,j) = \beta \cdot I^t(i-(\beta' \cdot MV_i), j-(\beta' \cdot MV_j)) + \beta' \cdot I^{t-1}(i+(\beta \cdot MV_i), j+(\beta \cdot MV_j)) \quad (4)$$

where $MV_i$ and $MV_j$ are the two components of the motion vector MV and $\beta' = (1-\beta)$.

The variables $\beta$ and $\beta'$ perform the motion vector interpolation as discussed above. In the embodiment of equation (4), the variables $\beta$ and $\beta'$ also weight the pixel values $I^t(i, j)$ and $I^{t-1}(i, j)$. In this embodiment, a higher weight is thus afforded the pixel values of the closer temporal frame. The mixing weight, $\alpha_{mix}$, (a real number between 0.0 and 1.0) is determined based on the values of two calculated error metrics, $SAD_{MV}$ and $SAD_{Zero}$. In one embodiment, $SAD_{MV}$ is the error metric 860, shown in FIG. 8, between the block 814 in the frame 810 and the prediction region 820 in the frame 805 upon which the block 815 was predicted. In this embodiment, $SAD_{Zero}$ is the error metric 865 between the collocated blocks 850 and 855 in the frames 805 and 810, respectively. An example of a method of computing $\alpha_{mix}$ is given below (though other embodiments are not restricted to this specific example).

$$\alpha_{mix} = f_1(SAD_{MV}) * f_2(SAD_{Zero}) \quad (5)$$

where examples of $f_1(SAD_{MV})$ are shown in FIGS. 9A to 9F and examples of $f_2(SAD_{Zero})$ are shown in FIGS. 10A to 10D (again, it should be noted that other embodiments are not restricted to these specific examples). The curves shown in FIGS. 9 and 10 represent normalized values of SAD for 10-bit pixel values. In other words, a normalized SAD for a block of four pixels can be calculated by dividing the sum of the four differences by four. The various SAD thresholds in FIGS. 9 and 10 are representative and may be obtained heuristically based on various factors some of which are the shape and type of the functions $f_1(\bullet)$ and $f_2(\bullet)$ and the noise level in the video sequences. Instead of employing fixed numbers, the thresholds can also be made adaptive to image content and the values of $SAD_{MV}$ and $SAD_{Zero}$.

Figure 10B:
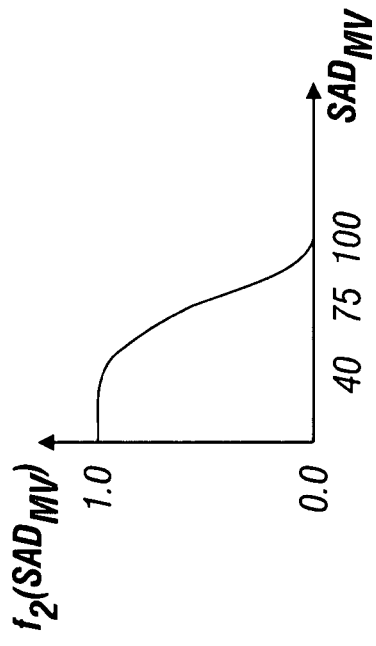
FIGS. 10A to 10D show examples of a second function used in calculating mixing weight factors.
Figure 10D:
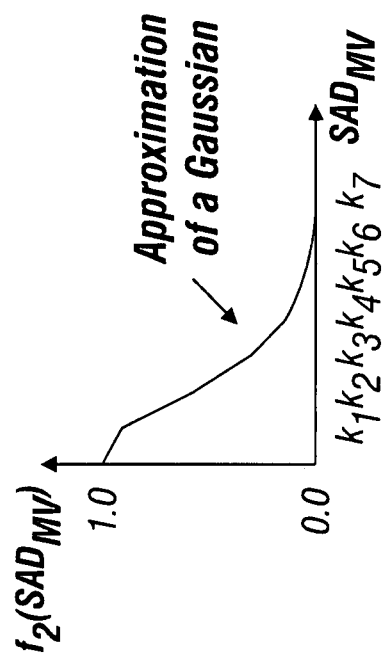
Figure 10A:
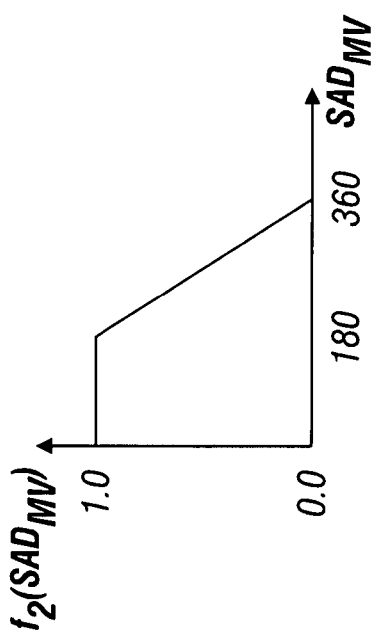
Figure 10C:
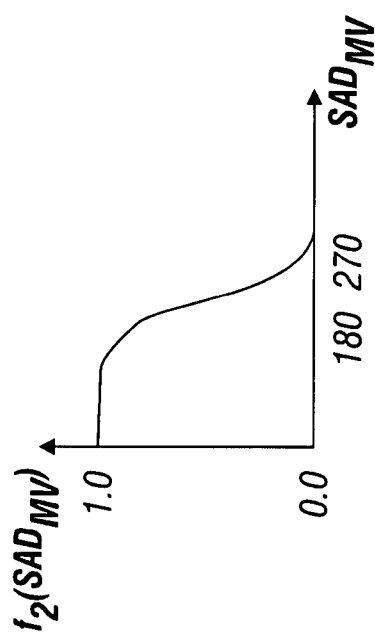
Figure 11B:
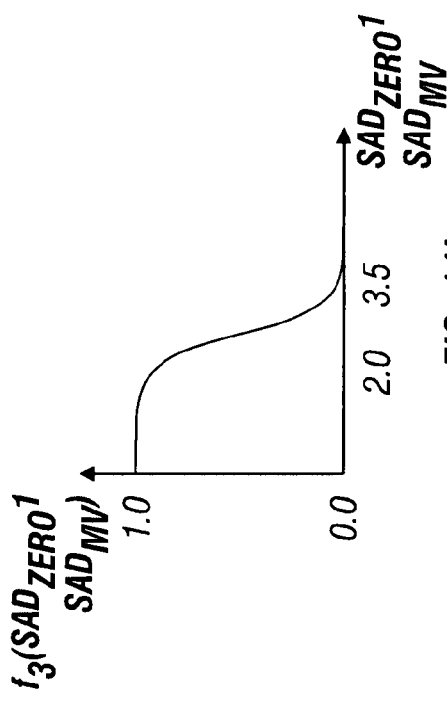
FIGS. 11A to 11D show examples of a third function used in calculating mixing weight factors.
Figure 11D:
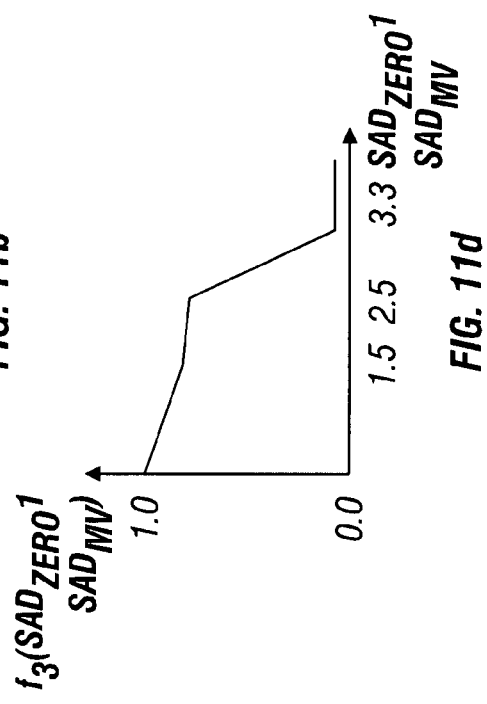
Figure 11A:
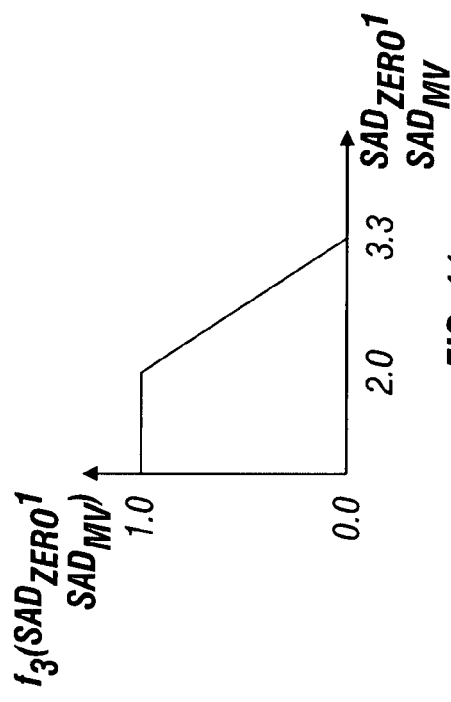
Figure 11C:
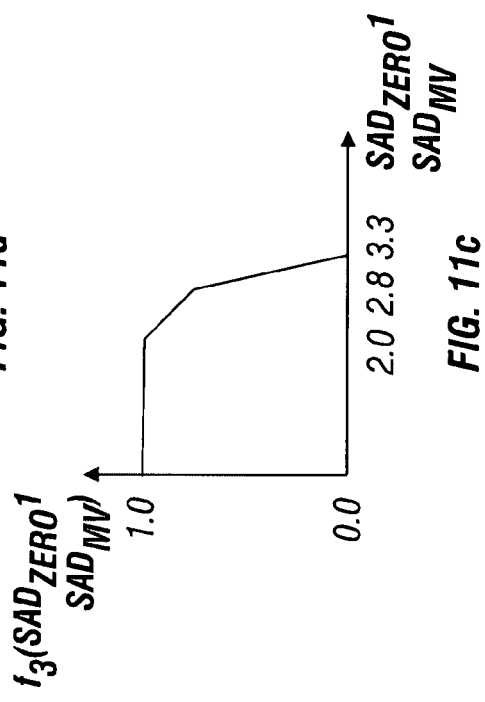

By calculating $\alpha_{mix}$ using equation 5 with any of the various curves shown in FIGS. 9 and 10, an $\alpha_{mix}=0.0$ (representing a fully transparent overlay) results for $SAD_{MV}$ values less than a first threshold (e.g., $SAD_{MV}=30$ in FIG. 9A) and for $SAD_{Zero}$ greater than a second threshold (e.g., $SAD_{Zero}=360$ in FIG. 10A). In other words, when the motion compensated prediction is very good ($SAD_{MV}$ less than the first threshold) or the virtual zero motion vector prediction is very bad ($SAD_{Zero}$ greater than the second threshold), then only the motion compensated prediction is used in the combined pixel value. The middle portions of the curves in FIGS. 9 and 10 result in varying combinations of the motion compensated prediction portion and the virtual zero motion vector portion.

In one embodiment, the ratio of $SAD_{Zero}$ and $SAD_{MV}$ can be used to further control the value of $\alpha_{mix}$ as shown in the equation below.

$$\alpha_{mix} = f_1(SAD_{MV}) * f_2(SAD_{Zero}) * f_3(SAD_{Zero}/SAD_{MV}) \quad (6)$$

An example of the function $f_3(SAD_{Zero}/SAD_{MV})$ is shown in FIGS. 11A to 11D. As discussed above in reference to FIGS. 9 and 10, the values of the $SAD_{Zero}/SAD_{MV}$ thresholds in the curves shown in FIG. 11 are representative and heuristic. The curves tend to decrease the mixing weight factor when the error metric corresponding to the virtual zero motion vector portion is large compared to the error metric corresponding to the motion compensated portion.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of compressing video data comprising:
   determining a first prediction of one or more pixel values in a first video frame based on one or more non-collocated pixel values in a second video frame;
   determining a second prediction of the one or more pixel values in the first video frame based on one or more collocated pixel values of a stationary transparent overlay in the second video frame;
   determining a mixing weight factor to be used to combine the first and second predictions during reconstruction of the one or more pixel values;
   calculating a first error metric between the first prediction pixel values and the pixel values in the first video frame; and
   calculating a second error metric between the second prediction pixel values and the pixel values in the first video frame; and
   wherein determining the mixing weight factor is based on the calculated first and second error metrics.

2. The method of claim 1, wherein determining the mixing weight factor results in a larger weight being applied to the first prediction than the second prediction when the first error metric is less than the second error metric.

3. The method of claim 1, wherein the determined mixing weight factor is in a range greater than or equal to zero and less than or equal to one, where a value of one results in only the first prediction contributing to the combined prediction and a value of zero results in only the second prediction contributing to the combined prediction.

4. A method of video processing comprising:
   receiving a first frame of video data;
   receiving a second frame of video data, wherein a first set of one or more pixel values of the second frame is predicted, using motion estimation, from a second set of one or more non-collocated pixel values of the first frame of video data;
   determining a first prediction of a third set of one or more identified pixels of a third frame based on the motion estimation between the second frame and the first frame;
   determining a second prediction of the third set of one or more pixels of the third frame based on collocated pixels of a transparent overlay of the first frame, the second frame, or a combination thereof;
   calculating values of the one or more identified pixels of the third set by combining the first prediction and the second prediction;
   calculating a first error metric between the pixel values of the first set of one or more pixel values of the second frame and the pixel values of the second set of non-collocated pixel values in the first frame;
   calculating a second error metric between the collocated pixels of the transparent overlay of the first frame and the second frame; and determining a mixing weight factor based on the calculated first and second error metrics;

wherein calculating values of the one or more identified pixels of the third set includes combining the first prediction and the second prediction using the determined mixing weight factor.

5. The method of claim 4, wherein the motion estimation includes a first motion vector indicating the relative positions of the first set of pixels of the second frame and the non-collocated second set of pixels of the first frame, the method further comprising determining a second motion vector between the third frame and the first frame, the second frame, or a combination thereof, the second motion vector being determined based on the first motion vector and temporal distances between the first, second and third frames and wherein the second motion vector identifies the third set of one or more pixels in the third frame.

6. The method of claim 5, wherein determining the first prediction of the third set of one or more pixels includes combining the non-collocated second set of one or more pixel values in the first frame and the first set of one or more pixel values in the second frame.

7. The method of claim 4 wherein the determined mixing weight factor results in the calculated values of the one or more identified pixels of the third set being substantially equal to the first prediction when the first error metric is less than a first threshold.

8. The method of claim 7 wherein the determined mixing weight factor results in the calculated values of the one or more identified pixels of the third set being substantially equal to the first prediction when the second error metric is greater than a second threshold.

9. The method of claim 8, wherein the determined mixing weight factor results in the calculated values of the one or more identified pixels of the third set being a varying combination of the first prediction and the second prediction when the first error metric is greater than the first threshold and the second error metric is less than the second threshold.

10. The method of claim 5, wherein the first frame and the second frame of video data are uncompressed video data, the method further comprising calculating the first motion vector using motion estimation.

11. A system for compressing video data comprising:
a motion estimation subsystem configured to determine a first prediction of one or more pixel values in a first video frame based on one or more non-collocated pixel values in a second video frame, and to determine a second prediction of the one or more pixel values in the first video frame based on one or more collocated pixel values of a stationary transparent overlay in the second video frame;
a mixing factor computation subsystem configured to determine a mixing weight factor to be used to combine the first and second predictions during reconstruction of the one or more pixel values;
an error metric calculation subsystem configured to calculate a first error metric between the first prediction pixel values and the pixel values in the first video frame, and to calculate a second error metric between the second prediction pixel values and the pixel values in the first video frame, wherein the mixing factor computation subsystem is configured to determine the mixing weight factor based on the calculated first and second error metrics.

12. The system of claim 11, wherein the determined mixing weight factor results in a larger weight being applied to the first prediction than the second prediction when the first error metric is less than the second error metric.

13. The system of claim 11, wherein the determined mixing weight factor is in a range greater than or equal to zero and less than or equal to one, where a value of one results in only the first prediction contributing to the combined prediction and a value of zero results in only the second prediction contributing to the combined prediction.

14. A system for video processing comprising:
a receiver configured to receive a first frame of video data, and to receive a second frame of video data, wherein a first set of one or more pixel values of the second frame is predicted, using motion estimation, from a second set of one or more non-collocated pixel values of the first frame of video data;
a reformatting subsystem configured to determine a first prediction of a third set of one or more identified pixels of a third frame based on the motion estimation between the second frame and the first frame, to determine a second prediction of the third set of one or more pixels of the third frame based on collocated pixels a transparent overlay of the first frame, the second frame, or a combination thereof and to calculate values of the one or more identified pixels of the third set by combining the first prediction and the second prediction;
an error metric calculation subsystem configured to calculate a first error metric between the pixel values of the first set of one or more pixel values of the second frame and the pixel values of the second set of non-collocated pixel values in the first frame, and to calculate a second error metric between the collocated pixels of the transparent overlay of the first frame and the second frame; and
wherein the reformatting subsystem is further configured to determine a mixing weight factor based on the calculated first and second error metrics, and to calculate values of the one or more identified pixels of the third set by combining the first prediction and the second prediction using the determined mixing weight factor.

15. The system of claim 14, wherein the motion estimation includes a first motion vector indicating the relative positions of the first set of pixels of the second frame and the non-collocated second set of pixels of the first frame, and the reformatting subsystem is further configured to determine a second motion vector between the third frame and the first frame, the second frame, or a combination thereof, the second motion vector being determined based on the first motion vector and temporal distances between the first, second and third frames and wherein the second motion vector identifies the third set of one or more pixels in the third frame.

16. The system of claim 14, wherein the reformatting subsystem is further configured to determine the first prediction of the third set of one or more pixels by combining the non-collocated second set of one or more pixel values in the first frame and the first set of one or more pixel values in the second frame.

17. The system of claim 14 wherein the determined mixing weight factor results in the calculated values of the one or more identified pixels of the third set being substantially equal to the first prediction when the first error metric is less than a first threshold.

18. The system of claim 17 wherein the determined mixing weight factor results in the calculated values of the one or more identified pixels of the third set being substantially equal to the first prediction when the second error metric is greater than a second threshold.

19. The system of claim 18, wherein the determined mixing weight factor results in the calculated values of the one or more identified pixels of the third set being a varying combination of the first prediction and the second prediction when the first error metric is greater than the first threshold and the second error metric is less than the second threshold.

20. The system of claim 15, wherein the first frame and the second frame of video data are uncompressed video data, the device further comprising a motion compensation subsystem configured to calculate the first motion vector using the motion estimation.

* * * * *